United States Patent
Jagota et al.

(10) Patent No.: US 9,977,797 B2
(45) Date of Patent: May 22, 2018

(54) COMBINED DIRECTED GRAPHS

(71) Applicant: salesforce.com, inc., San Francisco, CA (US)

(72) Inventors: Arun Kumar Jagota, Sunnyvale, CA (US); Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 428 days.

(21) Appl. No.: 14/867,154

(22) Filed: Sep. 28, 2015

(65) Prior Publication Data

US 2017/0091229 A1    Mar. 30, 2017

(51) Int. Cl.
*G06F 17/30* (2006.01)
*G06N 5/02* (2006.01)

(52) U.S. Cl.
CPC .. *G06F 17/30292* (2013.01); *G06F 17/30345* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

OTHER PUBLICATIONS

U.S. Appl. No. 13/986,251, filed Apr. 16, 2013.

*Primary Examiner* — Debbie Le
(74) *Attorney, Agent, or Firm* — Dergosits & Noah LLP; Todd A. Noah (57) ABSTRACT

A combined directed graph is created having a corresponding node for each node in a first directed graph lacking a corresponding node in a second directed graph, each node in the second graph lacking a corresponding node in the first graph, and each node in the first graph having a corresponding node in the second graph. A corresponding directed arc is created in the combined directed graph for each arc in the first graph lacking a corresponding arc in the second directed graph, each arc in the second graph lacking a corresponding arc in the first graph, and each arc in the first graph having a corresponding arc in the second graph. A recommendation is output for a user to interact with a recommended object based on an object interaction and a conditional probability, in the combined graph, which corresponds to the recommended object and the object interaction.

20 Claims, 4 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,954,749 B2 * | 10/2005 | Greenblatt ........ G06F 17/30584 707/778 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,616,712 B2 * | 11/2009 | Chen .............. H04L 1/0047 375/340 |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,961,189 B2 * | 6/2011 | Purang ............. G06F 17/30994 345/418 |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,311,144 B1 * | 4/2016 | Krishnamoorthy ... G06F 9/4881 |
| 9,552,055 B2 * | 1/2017 | Li ..................... G06Q 30/0269 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0317038 A1 * | 10/2014 | Mojsilovic ............. G06Q 10/00 706/46 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0269647 A1 * | 9/2015 | Jagota ................ G06Q 30/0202 705/26.7 |

* cited by examiner

COMBINED DIRECTED GRAPHS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system may analyze ecommerce market baskets, shopping carts, or search results, which may be referred to as interaction sets, to create association rules in the form of X→Y, where X and Y are disjoint sets of objects. Such association rules may be used for making recommendations based on a sufficiently high confidence $P(Y|X)$, which may have the interpretation "the probability that an interaction set containing X also contains Y." A high confidence association rule may be used to recommend Y when a user has X in the current interaction set. However, even when a database system has interaction set data available, some interaction set sizes may be much larger than interaction set sizes used in typical ecommerce settings. For example, a user may purchase the information for several thousand business contacts in a single interaction, in contrast to typical ecommerce shopping baskets which usually contain less than 30 objects. Working with very large interaction set sizes substantially increases the computational complexity of interaction set analysis. Even a fast algorithm slows down immensely on large interaction sets because even if the database system seeks association rules X→Y in which |X| is small, such as n=3, an interaction set of size m has "m choose n" subsets of cardinality n each, each of which necessarily has to be enumerated.

When different users interact with different sets of objects from a database, a recommendation model may learn which sets of objects are in the same interaction set more frequently with others. In a multi-tenant database, there are numerous tenant organizations whose users interact with sets of objects. While leveraging such data from multiple tenant organizations could improve the recommendations made by a recommendation model, multi-tenant databases usually forbid data from one tenant organization to be visible outside of that tenant organization. Therefore, challenges exist for generating, training, and using a multi-tenant recommendation model.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for combined directed graphs. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for combined directed graphs will be described with reference to example embodiments. The following detailed description will first describe a method for combining directed graphs. Next, example directed graphs are described.

A database system may construct multiple recommendation models which are each specific to their respective tenant organization, and then combine these tenant-specific recommendation models into a multi-tenant recommendation model to leverage data from multiple tenant organizations. A tenant-specific recommendation model learns from tenant-specific interaction sets, but may not require persistent storage of interaction sets. An interaction set may need to be available only for a short amount of time, such as milliseconds, so that a tenant-specific recommendation model can incrementally learn from its contents. A different type of recommendation model may learn from each type of interaction set. For example, a purchase-based model for a tenant may learn from the tenant's contacts purchased market baskets and/or accounts purchased market basket, while a search-based model for the tenant may learns from the tenant's contact search results and/or account search results. If a tenant has multiple model types learning from the tenant's data, these multiple model types may be merged into a combined model for the tenant.

Let U denote a universe of objects. An interaction set is a particular subset S of these objects that occurred in a particular interaction of the type being modeled, such as a purchase interaction or a search interaction. A tenant-specific model is structurally a directed graph whose nodes correspond to U. From each node i to node j there may be a directed arc i→j with a corresponding weight denoting $P_{ij}=P(j|i)$, the fraction of interaction sets containing i that also contain j. Not all nodes are connected by directed arcs because a model may discard some potential directed arcs whose $P_{ij}$ are below a certain threshold, which keeps the directed graph sparse. Associated with each node i is a number $n_i$, the number of interaction sets that contain object i. A tenant-specific model also stores n, the total number of interaction sets. $P_i=n_i/n$, the fraction of interaction sets that contain object i. may be constructed from $n_i$ and n. As an example, when interaction sets are purchase-based, $P_i$ may be interpreted as the probability of purchasing object i and $P_{ij}$ may be interpreted as the probability of purchasing object j given that object i has been purchased.

When a search-based model learns from search results, higher ranked search results may be more significant than lower ranked search results, the co-occurrence of two objects in a result set may be more significant when both objects have high ranks, and the co-occurrence of two objects in narrow searches (small result sets) may be more significant than the co-occurrence of two objects in wide searches (large result sets). $r_i$ denotes the rank order of object i in a search results set, wherein rank order 1 denotes the highest ranked item. The system may set the weight of object i in this search results set to $w_i = e^{-a(r_i-1)}$. Here a>0 is the decay rate, an adjustable parameter. Other examples of rank order weights include $1/r_i$ and $1/r_i^2$. A directed graph's parameters may be modified to accommodate a rank order weight. These parameters are n—the number of baskets, $n_i$ ($P_i$)—the number (fraction) of baskets that contain object i, $n_{ij}$—the number of baskets containing both i and j, and $P_{ij}$—the fraction of objects containing i that also contain j. While n remains unchanged, $n_i$ becomes $n_i = \Sigma w_i^b$, where b denotes a basket and $w_i^b$ the weight of object i in this basket and the sum is over all s, and $n_{ij}$ becomes $n_{ij} = \Sigma w_i^b w_j b$. The formulae for $P_i$ and $P_{ij}$ remain unchanged, but they use the new formulae for $n_i$ and $n_{ij}$.

The system may use "importance" weights for directed graphs when combining the directed graphs, in which the combined directed graph is influenced more from the directed graph with the higher weight. For example, if the system is creating a combined directed graph from a purchase-based directed graph and a search-based directed graph, the system may assign a higher weight w1 to the purchase-based directed graph and a lower weight w2 to the search-based directed graph because, generally speaking, two contacts purchased together provide stronger evidence for their relatedness than if two contacts show up in the same set of search results.

A combined directed graph H is a union of directed graph $G_1$ and directed graph $G_2$, with optional weights $w_1$ and $w_2$, respectively. If w1 equals w2, the system combines the directed graphs without weighting each directed graph. $V(H) = V(G_i)$ u $V(G_2)$, $A(H) = A(G_1) \cup A(G_2)$, where V(G) denotes the vertices or nodes in the directed graph G, and A(G) denotes the set of directed arcs in the directed graph G. The system obtains $n_i(H)$ for every i∈V(H), and deduces $P_{ij}(H)$ for every i→j∈A(H).

In accordance with embodiments described herein, there are provided systems and methods for combining directed graphs.

A system identifies a first directed graph having nodes connected by directed arcs and a second directed graph having nodes connected by directed arcs. The system creates a combined directed graph having a corresponding node for: each node in the first directed graph lacking a corresponding node in the second directed graph, each node in the second directed graph lacking a corresponding node in the first directed graph, and each node in the first directed graph having a corresponding node in the second directed graph. The system creates a corresponding directed arc in the combined directed graph for each directed arc in the first directed graph lacking a corresponding directed arc in the second directed graph, each directed arc in the second directed graph lacking a corresponding directed arc in the first directed graph, and each directed arc in the first directed graph having a corresponding directed arc in the second directed graph. The system outputs a recommendation for a user to interact with a recommended object based on an object interaction and a conditional probability, in the combined graph, which corresponds to the recommended object and the object interaction.

In an extremely simplified example, a system identifies Acme Corp.'s directed graph, in which directed arc B→A connects node B to node A and directed arc C→B connects node C to node B, and identifies Mega Corp.'s directed graph, in which directed arc C→D connects node C to node D and directed arc D→E connects node D to node E, where Acme Corp. and Mega Corp. are tenants in a multi-tenant database. The system creates corresponding nodes A and B in a combined directed graph for nodes A and B in Acme Corp.'s directed graph that lack a corresponding node in Mega Corp.'s directed graph. The system creates corresponding nodes D and E in the combined directed graph for nodes D and E in Mega Corp.'s directed graph that lack a corresponding node in Acme Corp.'s directed graph. The system creates a corresponding node C in the combined directed graph for the node C in Acme Corp.'s directed graph that has a corresponding node C in Mega Corp.'s directed graph. The system creates a corresponding directed arcs B→A and C→B in the combined directed graph for the directed arcs B→A and C→B in Acme Corp.'s directed graph that lack a corresponding directed arc in Mega Corp.'s directed graph. The system creates corresponding directed arcs C→D and D→E in the combined directed graph, for the directed arcs C→D and D→E in Mega Corp.'s directed graph that lack a corresponding directed arc in Acme Corp.'s directed graph. The system creates no additional directed arcs in the combined directed graph because no directed arc in Acme Corp.'s directed graph has a corresponding directed arc in Mega Corp.'s directed graph. The system outputs a recommendation for a user to purchase contacts B and D based on the user's purchase of contact C and the conditional probability in the combined directed graph which corresponds to purchasing contact B given that contact C is purchased and the conditional probability in the combined directed graph which corresponds to purchasing contact D given that contact C is purchased. While Acme Corp.'s directed graph only recommends purchasing contact B if contact C is purchased, and Mega Corp.'s directed graph only recommends purchasing contact D if contact C is purchased, the combined directed graph leverages data from multiple tenants in a multi-tenant database to recommend purchasing both contact B and contact D if contact C is purchased.

While one or more implementations and techniques are described with reference to an embodiment in which combining directed graphs is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
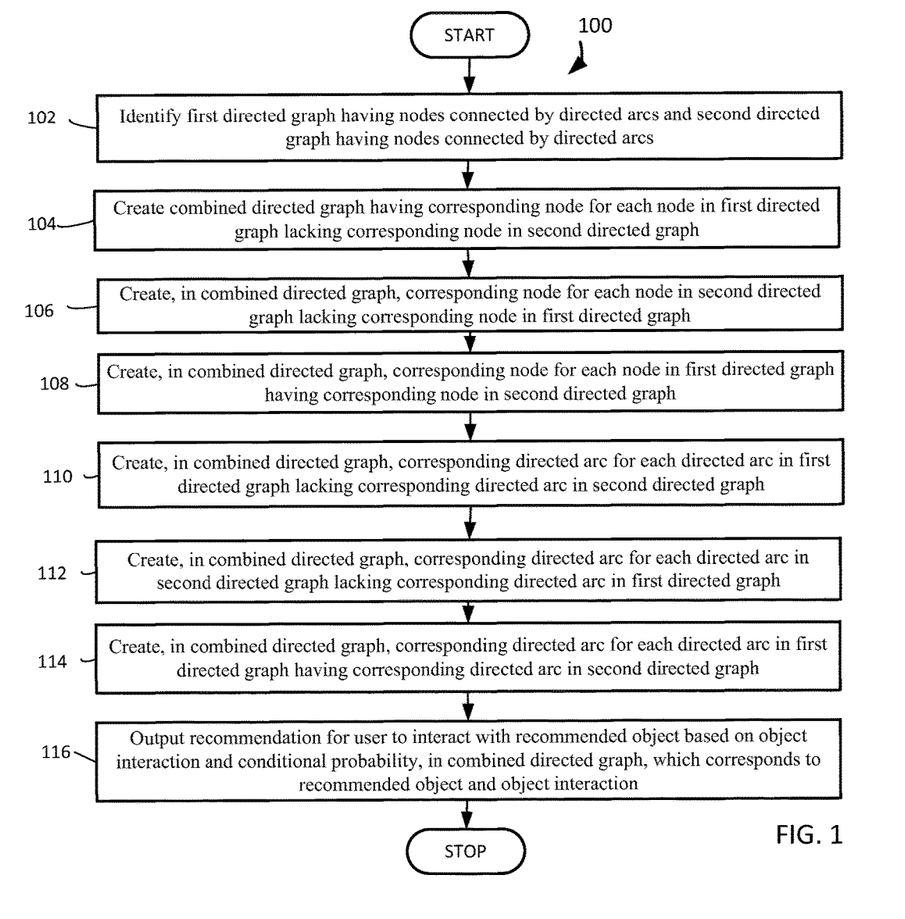
FIG. 1 is an operational flow diagram illustrating a high level overview of a method for combining directed graphs, in an embodiment.
Figure 2:
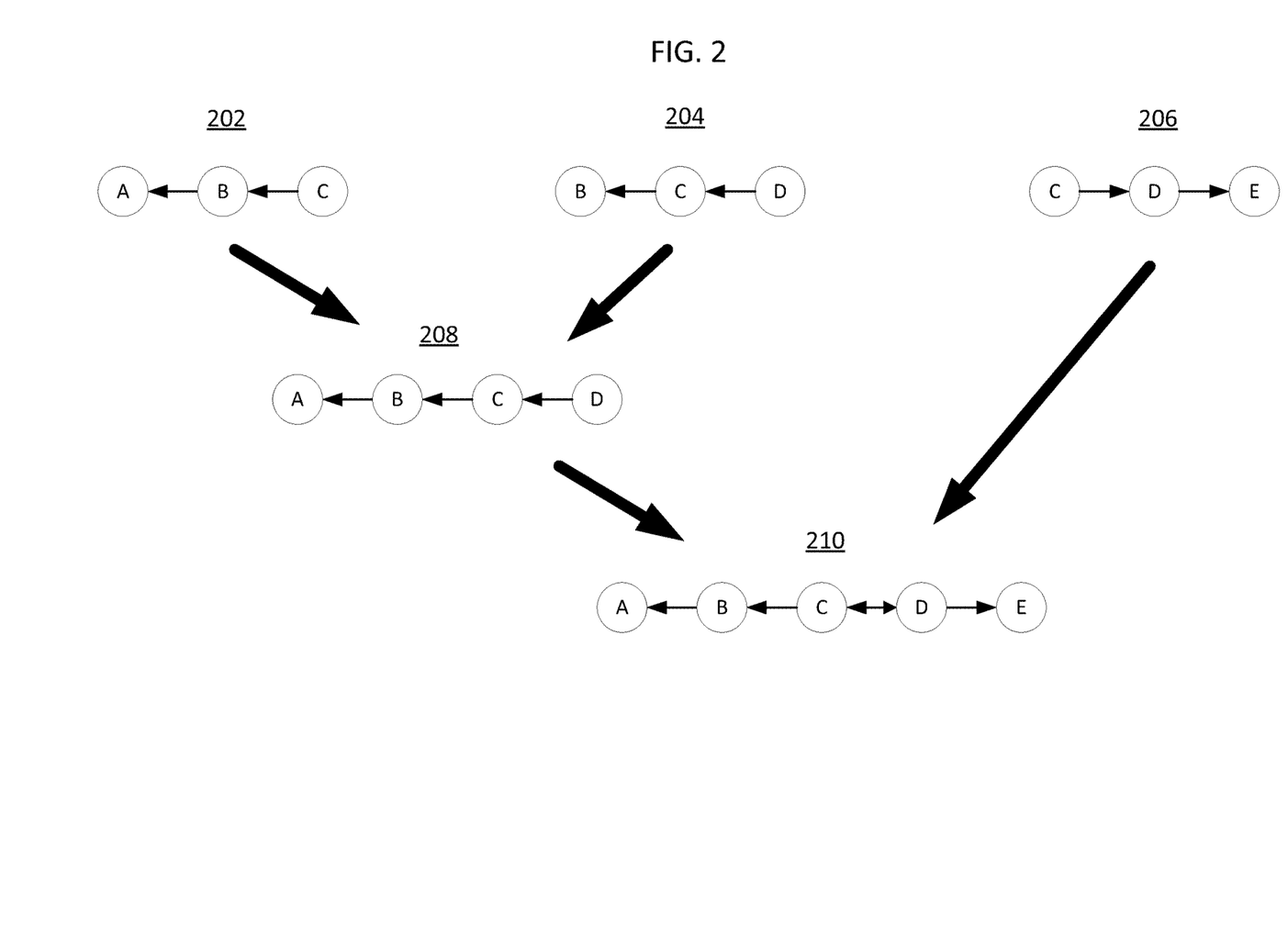
FIG. 2 illustrates example directed graphs, in an embodiment.

FIG. 1 is an operational flow diagram illustrating a high level overview of a method 100 for combining directed graphs. The example directed graphs which are described below in reference to FIG. 1 are depicted in FIG. 2 and described below in reference to FIG. 2. Although the extremely simplified examples of directed graphs described below and depicted in FIG. 2 have only a few nodes, each of which is connected by a directed arc, database systems may have directed graphs with millions of nodes, only some of which are connected by thousands of directed arcs.

The system identifies a first directed graph having nodes connected by directed arcs and a second directed graph having nodes connected by directed arcs, block 102. For example and without limitation, this can include the system identifying Acme Corp.'s purchase-based directed graph 202, in which directed arc B→A connects node B to node A and directed arc C→B connects node C to node B, identifying Acme Corp.'s search-based directed graph 204, in which directed arc C→B connects node C to node B and directed arc D→C connects node D to node C, and identifying Mega Corp.'s purchase-based directed graph 206, in which directed arc C→D connects node C to node D and directed arc D→E connects node D to node E.

A first directed graph may include proprietary data for a first tenant in a multi-tenant database and a second directed graph may include proprietary data for a second tenant in the multi-tenant database. For example, the directed graphs 202 and 204 include proprietary data for Acme Corp., while the directed graph 206 includes proprietary data for Mega Corp.

A directed arc from a first node in a directed graph to a second node in the directed graph may represent a conditional probability that previous users who interacted with a first object corresponding to the first node in the directed graph also interacted with a second object corresponding to the second node in the directed graph. For example, the directed arc B→A in Acme Corp.'s purchase-based directed graph 202 represents a conditional probability that previous users who purchased contact B also purchased contact A in the same market basket.

Each node in a directed graph may be associated with a corresponding node count identifying a number of user interaction sets that include a corresponding object. For example, node A in Acme Corp.'s purchase-based directed graph 202 is associated with a node count of 100 which specifies that 100 market baskets included the purchase of contact A.

The system creates a combined directed graph having a corresponding node for each node in the first directed graph lacking a corresponding node in the second directed graph, block 104. By way of example and without limitation, this can include the system creating a corresponding node A in Acme Corp.'s combined directed graph 208 for node A in Acme Corp.'s purchase-based directed graph 202 that lacks a corresponding node in Acme Corp.'s search-based directed graph 204. In another example, the system creates a corresponding node A in a multi-tenant combined directed graph 210 for node A in Acme Corp.'s combined directed graph 208 that lacks a corresponding node in Mega Corp.'s purchase-based directed graph 206.

A recommendation model may use external reference identifiers, such as provided by Jigsaw.com or Dunn & Bradstreet, to identify when two different tenant organizations are referring to the same object in their respective databases. Data confidentiality is preserved for tenant organizations because it is not possible to deduce tenant-specific data, or even tenant-specific statistical preferences from a multi-tenant recommendation model which only has statistical information on relationships among objects identified by external reference identifiers. The system does not require every tenant organization's data to have been linked to external reference identifiers in a "golden truth database," nor every data record in a linked tenant organization to have been linked, as the system uses whatever linkages are available.

For every $i \in V(G_1)-V(G_2)$, the system obtains $n_i(H) = w_i * n_i(G_1)$. Each node in a combined directed graph which corresponds to a node in a first directed graph which lacks a corresponding node in a second directed graph, may be associated with a corresponding node count identifying a number of user interaction sets which include a corresponding object in the first directed graph. For example, node A in Acme Corp.'s combined directed graph 208 is associated with a node count of 100 from Acme Corp.'s purchase-based directed graph 202, which specifies that 100 market baskets included the purchase of contact A. In another example, node A in the multi-tenant combined directed graph 210 is associated with a node count of 100 from Acme Corp.'s purchase-based directed graph 202, which specifies that 100 market baskets included the purchase of contact A.

The system creates, in the combined directed graph, a corresponding node for each node in the second directed graph lacking a corresponding node in the first directed graph, block 106. In embodiments, this can include the system creating a corresponding node D in Acme Corp.'s combined directed graph 208 for node D in Acme Corp.'s search-based directed graph 204 that lacks a corresponding node in Acme Corp.'s purchase-based directed graph 202. In another example, the system creates a corresponding node E in the multi-tenant combined directed graph 210 for node E in Mega Corp.'s purchase-based directed graph 206 that lacks a corresponding node in Acme Corp.'s combined directed graph 208.

For every $i \in V(G_2)-V(G_1)$, the system obtains $n_i(H) = w_2 * n_i(G_2)$. Each node in a combined directed graph which corresponds to a node in a second directed graph which lacks a corresponding node in a first directed graph, may be associated with a corresponding node count identifying a number of user interaction sets which include a corresponding object in the second directed graph. For example, node D in Acme Corp.'s combined directed graph 208 is associated with a node count of 150 from Acme Corp.'s search-based directed graph 204, which specifies that 150 interaction sets included the search of contact A. The system may give greater significance to purchases than to searches by using a standard weight w1=1.0 for Acme Corp.'s purchase-based directed graph 202 and using a reduced weight w2=0.5 for Acme Corp.'s search-based directed graph 204 to create Acme Corp.'s combined directed graph 208. Continuing this weighted graphs example, the node count for node D in Acme Corp.'s combined directed graph 208 would be 75, or the original node weight of 150 for node D in Acme Corp.'s search-based directed graph 204 multiplied by 0.5 for the weight w2 for Acme Corp.'s search-based directed graph 204. If the system uses rank order weights for Acme Corp.'s search-based directed graph 204, the original node weight of 150 for node D in Acme Corp.'s search-based directed graph 204 may represent more than 150 search result sets in which node D appears as a search result. A search result set in which contact D was highly ranked may assign a rank order weight of 0.5 to contact D, while another search result set in which contact D was lowly ranked may assign a rank order weight of 0.01 to contact D, such that more than 150 rank order weights are aggregated to produce the node count of 150 for contact D in Acme Corp.'s search-based directed graph 204. In another example, node E in the multi-tenant contacts directed graph 210 is associated with a node count of 200 from Mega Corp.'s purchase-based directed graph 206, which specifies that 200 market baskets included the purchase of contact E.

The system creates, in the combined directed graph, a corresponding node, for each node in the first directed graph having a corresponding node in the second directed graph, block 108. For example and without limitation, this can include the system creating corresponding nodes B and C in Acme Corp.'s combined directed graph 208 for the nodes B and C in Acme Corp.'s purchase-based directed graph 202 that have corresponding nodes B and C in Acme Corp.'s search-based directed graph 204. In another example, the system creates corresponding nodes C and D in the multi-tenant combined directed graph 210 for the nodes C and D in Acme Corp.'s combined directed graph 208 that have corresponding nodes C and D in Mega Corp.'s purchase-based directed graph 206.

For every $i \in V(G_1) \cap V(G_2)$, the system obtains $n_i(H) = w_1 * n_i(G_1) + w_2 * n_i(G_2)$. Each node in a combined directed graph which corresponds to a node in a first directed graph which has a corresponding node in a second directed graph, may be associated with a corresponding total node count identifying a number of user interaction sets which include a corresponding object in the first directed graph aggregated with a number of user interaction sets which include a corresponding object in the second directed graph. For example, node B in Acme Corp.'s combined directed graph 208 is associated with a node count of 260 based on corresponding node counts of 120 and 140 for node B. Continuing this example, Acme Corp.'s purchase-based directed graph 202 specifies that 120 interaction sets included the purchase of contact B, and Acme Corp.'s search-based directed graph 204 specifies that 140 interaction sets included the search of contact B. If the system gives greater significance to purchases than to searches, the node count for node B in Acme Corp.'s combined directed graph 208 may be 190, which is based on the node count of 120 for node B in Acme Corp.'s purchase-based directed graph 204 added to the adjusted node weight of 70 for node B in Acme Corp.'s search-based directed graph 204, which is the original node weight of 140 multiplied by 0.5 for the weight w2 for Acme Corp.'s search-based directed graph 204. In another example, node D in the multi-tenant combined directed graph 210 is associated with a node count of 310 based on corresponding node counts of 150 and 160 for node D. Continuing this other example, Acme Corp.'s combined directed graph 208 specifies that 150 interaction sets included the search of contact D, and Mega Corp.'s purchase-based directed graph 206 specifies that 160 interaction sets included the purchase of contact D.

The system creates, in the combined directed graph, a corresponding directed arc for each directed arc in the first directed graph lacking a corresponding directed arc in the second directed graph, block 110. By way of example and without limitation, this can include the system creating a corresponding directed arc B→A in Acme Corp.'s combined directed graph 208 for the directed arc B→A in Acme Corp.'s purchase-based directed graph 202 that lacks a corresponding directed arc in Acme Corp.'s search-based directed graph 204. In another example, the system creates a corresponding directed arc C→B in the multi-tenant combined directed graph 210 for the directed arc C→B in Acme Corp.'s combined directed graph 208 that lacks a corresponding directed arc in Mega Corp.'s purchase-based directed graph 206.

For every $i \to j \in A(G_1) - A(G_2)$, the system deduces $P_{ij}(H) = P_{ij}(G_1)$. Each directed arc in a combined directed graph which corresponds to a directed arc in a first directed graph which lacks a corresponding directed arc in a second directed graph, may represent a conditional probability that previous users who interacted with an object corresponding to a beginning node in the first directed graph where the directed arc begins also interacted with an object corresponding to an ending node in the first directed graph where the directed arc ends. For example, the directed arc B→A in Acme Corp.'s combined directed graph 208 represents the conditional probability that 10% of the users who purchased contact B also purchased contact A in the same interaction set because the directed arc B→A in Acme Corp.'s purchase-based directed graph 202 represents the conditional probability that 10% of the users who purchased contact B also purchased contact A in the same interaction set. In another example, the directed arc C→B in the multi-tenant combined directed graph 210 represents the conditional probability that 15% of the users who interacted with contact C also interacted with contact B in the same interaction set because the directed arc C→B in Acme Corp.'s combined directed graph 206 represents the conditional probability that 15% of the users who interacted with contact C also interacted with contact B in the same interaction set.

A measure that may work better for recommendations than P (j|i) is lift. The lift $l_{ij} = P (j|i)/P_j$. So $l_{ij}$ is much greater than one precisely when the probability of j given i is much higher than the probability of j. Lift measures the "lift" in the probability of j that the system obtains from knowing i. Since $l_{ij}$ is efficiently computable from P (j|i) and $P_j$, the system may easily accommodate the use of lift for recommendation purposes.

The system creates, in the combined directed graph, a corresponding directed arc for each directed arc in the second directed graph lacking a corresponding directed arc in the first directed graph, block 112. In embodiments, this can include the system creating a corresponding directed arc D→C in Acme Corp.'s combined directed graph 208 for the directed arc D→C in Acme Corp.'s search-based directed graph 204 that lacks a corresponding directed arc in Acme Corp.'s purchase-based directed graph 202. In another example, the system creates a corresponding directed arc D→E in the multi-tenant combined directed graph 210 for the directed arc D→E in Mega Corp.'s purchase-based directed graph 206 that lacks a corresponding directed arc in Acme Corp.'s combined directed graph 208.

For every $i \to j \in A(G_2) - A(G_1)$, the system deduces $P_{ij}(H) = P_{ij}(G_2)$. Each directed arc in a combined directed graph which corresponds to a directed arc in a second directed graph which lacks a corresponding directed arc in a first directed graph, may represent a conditional probability that previous users who interacted with an object corresponding to a beginning node in the second directed graph where the directed arc begins also interacted with an object corresponding to an ending node in the second directed graph where the directed arc ends. For example, the directed arc D→C in Acme Corp.'s combined directed graph 208 represents the conditional probability that 20% of the users who interacted with contact D also had interacted with contact C in the same interaction set because the directed arc D→C in Acme Corp.'s search-based directed graph 204 represents the conditional probability that 20% of the users who had contact D in a search result set also had contact C in the same search result set. In another example, the directed arc D→E in the multi-tenant combined directed graph 210 represents the conditional probability that 25% of the users who interacted with contact D also interacted with contact E in the same interaction set because the directed arc D→E in Mega Corp.'s purchase-based directed graph 208 represents the conditional probability that 25% of the users who purchased contact D also purchased contact E in the same market basket.

The system creates, in the combined directed graph, a corresponding directed arc for each directed arc in the first directed graph having a corresponding directed arc in the second directed graph, block 114. For example and without limitation, this can include the system creating a corresponding directed arc C→B in Acme Corp.'s combined directed graph 208 for the directed arc C→B in Acme Corp.'s purchase-based directed graph 202 that has a corresponding directed arc C→B in Acme Corp.'s search-based directed graph 204. In another example, the system creates a corresponding directed arc D→C in the multi-tenant combined directed graph 210 for the directed arc D→C in Acme Corp.'s combined directed graph 208 that has a corresponding directed arc D→C in Mega Corp.'s purchase-based directed graph 206.

For every i→j∈A($G_1$)∩A($G_2$), the system deduces $P_{ij}(H)$= [$w_1*n_i(G_1)*P_{ij}(G_1)+w_2*n_i(G_2)*P_{ij}(G_2)$]/[($w_1*n_i(G_1)+w_2*n_i(G_2)$)]. Each directed arc in the combined directed graph which corresponds to a directed arc in the first directed graph which has a corresponding directed arc in the second directed graph, may represent a combined conditional probability that previous users who interacted with an object corresponding to a beginning node in the combined directed graph where the corresponding directed arc begins also interacted with an object corresponding to an ending node in the combined directed graph where the corresponding directed arc ends. The combined conditional probability which represents the corresponding directed arc may equal an adjusted conditional probability divided by a combined node count. The adjusted conditional probability may equal a first adjusted conditional probability aggregated with a second adjusted conditional probability. The first adjusted conditional probability may equal a conditional probability that previous users who interacted with an object corresponding to a beginning node in the first directed graph where a corresponding directed arc begins also interacted with an object corresponding to an ending node in the first directed graph where the corresponding directed arc ends multiplied by a corresponding node count identifying a number of user interaction sets which include the object corresponding to the beginning node in the first directed graph where the corresponding directed arc begins. The second adjusted conditional probability may equal a conditional probability that previous users who interacted with an object corresponding to a beginning node in the second directed graph where a corresponding directed arc begins also interacted with an object corresponding to an ending node in the second directed graph where the corresponding directed arc ends multiplied by a corresponding node count identifying a number of user interaction sets which include the object corresponding to the beginning node in the second directed graph where the corresponding directed arc begins. The combined node count may equal a number of user interaction sets which include the object corresponding to the beginning node in the first directed graph aggregated with a number of user interaction sets which include the object corresponding to the beginning node in the second directed graph.

For example, the directed arc D→C in the multi-tenant combined directed graph 210 represents the conditional probability that 25% of the users who interacted with contact D in an interaction set also interacted with contact C in the same interaction set based on conditional probabilities for directed arcs in Acme Corp.'s combined directed graph 208 and Mega Corp.'s purchase-based directed graph 206. The directed arc D→C in Acme Corp.'s combined directed graph 208 represents the conditional probability that 20% of the users who interacted with contact D in an interaction set also interacted with contact C in the same interaction set, while the directed arc D→C in Mega Corp.'s purchase-based directed graph 206 represents the conditional probability that 30% of the users who purchased contact D also purchased contact C in the same market basket. The system combines these two conditional probabilities by weighting each of the conditional probabilities by the corresponding node count for the node where the directed arcs begin, summing the node-weighted conditional probabilities, and then dividing the sum of the node-weighted conditional probabilities by an aggregation of the corresponding node counts. In this example, the system multiplies the conditional probability of 20% for first directed arc D→C by the node count of 150 for the first node D to result in the first node-weighted conditional probability of 30, multiplies the conditional probability of 30% for second directed arc D→C by the node count of 160 for the second node D to result in the second node-weighted conditional probability of 48, and then sums the first node-weighted conditional probability of 30 with the second node-weighted conditional probability of 48 to result in the summed node-weighted probability of 78. The system aggregates the first node count of 150 for the first node D with the second node count of 160 for the second node D to result in the aggregated node count of 310 for the node D. Then the system divides the summed node-weighted probability of 78 by the aggregated node count of 310 for the node D to result in the combined conditional probability of 25% for the directed arc D→C in the multi-tenant combined directed graph 210.

If the system calculates the combined conditional probability for the directed arc C→B in Acme Corp.'s combined directed graph 208, the system may use the weights w1 and w2 for Acme Corp.'s purchase-based directed graph 202 and Acme Corp.'s search-based directed graph 204, respectively, as indicated in the last equation above, which calculates the combined conditional probability.

The system outputs a recommendation for a user to interact with a recommended object based on an object interaction and a conditional probability, in a combined directed graph, which corresponds to the recommended object and the object interaction, block 116. By way of example and without limitation, this can include the system outputting a recommendation for a user to purchase contacts B and D based on the user's purchase of contact C and the conditional probability in the multi-tenant combined directed graph 210 which corresponds to purchasing contact B given that contact C is purchased and the conditional probability in the multi-tenant combined directed graph 210 which corresponds to purchasing contact D given that contact C is purchased. While Acme Corp.'s purchase-based directed graph 202 only recommends purchasing contact B if contact C is purchased, and Mega Corp.'s purchase-based directed graph 206 only recommends purchasing contact D if contact C is purchased, the multi-tenant combined directed graph 210 leverages data from multiple tenants in a multi-tenant database to recommend purchasing both contact B and contact D if contact C is purchased.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

FIG. 2 illustrates example directed graphs, under an embodiment. As described above, FIG. 2 depicts Acme Corp.'s purchase-based directed graph 202, Acme Corp.'s search-based directed graph 204, Mega Corp.'s purchase-based directed graph 206, Acme Corp.'s combined directed graph 208, and the multi-tenant combined directed graph 210. As described above, the system combines Acme Corp.'s purchase-based directed graph 202 with Acme Corp.'s search-based directed graph 204 to create Acme Corp.'s combined directed graph 208, and combines Acme Corp.'s combined directed graph 208 with Mega Corp.'s purchase-based directed graph 206 to create the multi-tenant combined directed graph 210.

System Overview

Figure 3:
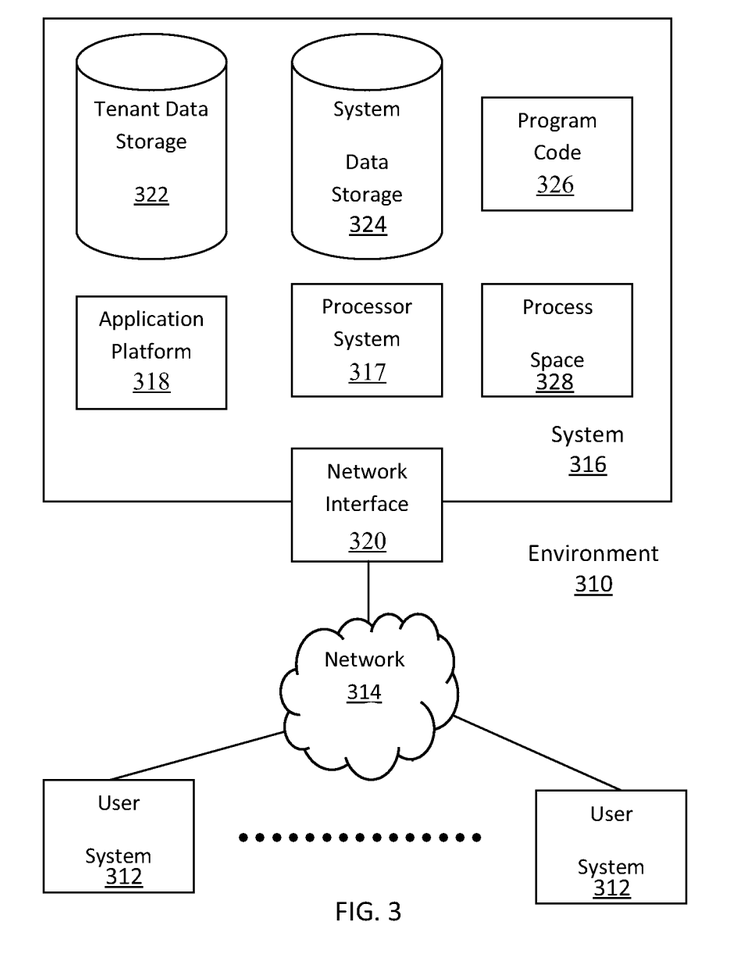
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
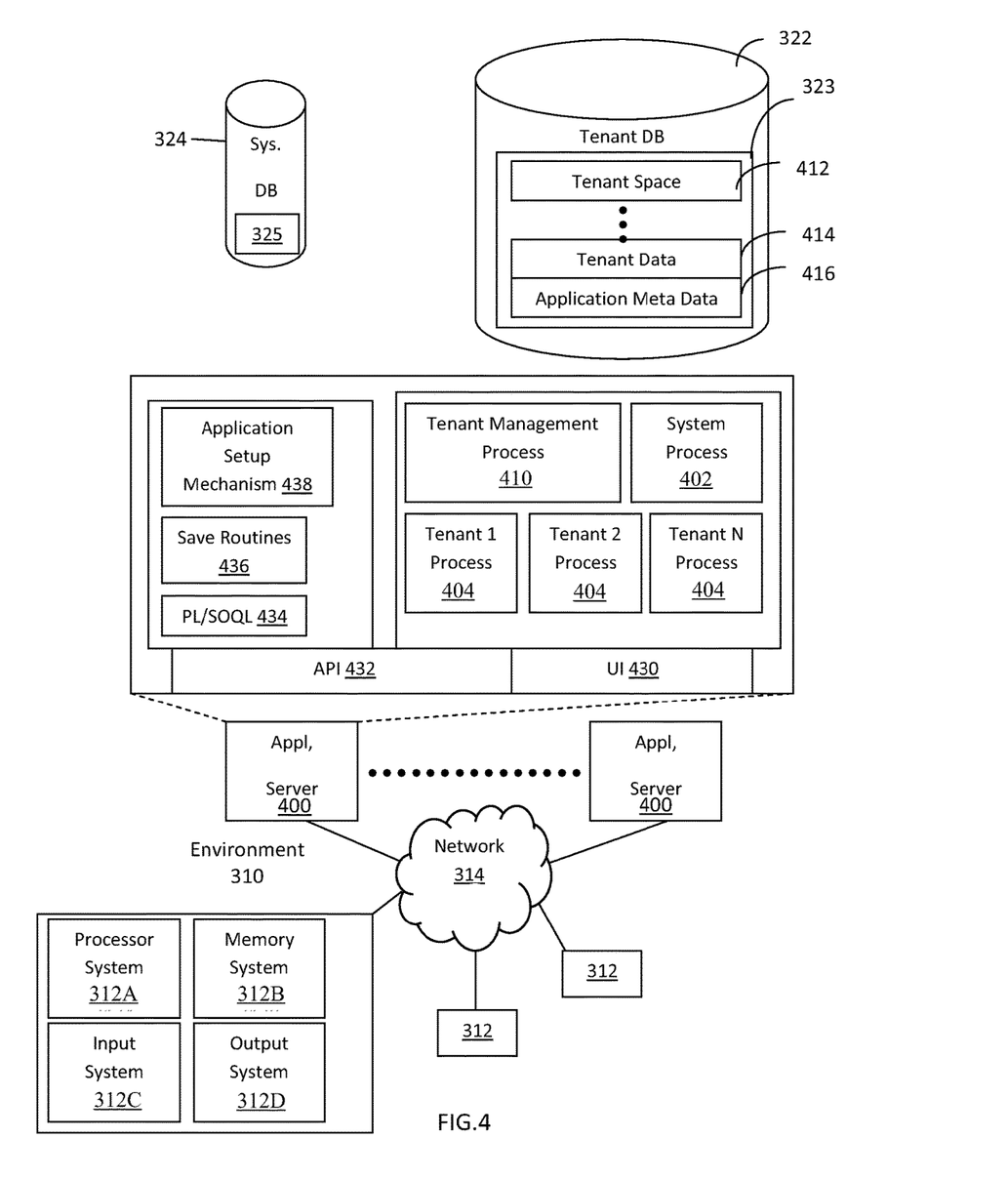
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes.

Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for combining directed graphs, the system comprising:
one or more processors; and
a non-transitory computer readable medium storing a plurality of instructions, which when executed, cause the one or more processors to:
identify, by a database system, a first directed graph having nodes connected by directed arcs and a second directed graph having nodes connected by directed arcs, a directed arc from a first node in a directed graph to a second node in the directed graph represents a conditional probability that previous users who interacted with a first object corresponding to the first node in the directed graph also interacted with a second object corresponding to the second node in the directed graph;
create, by the database system, a combined directed graph having a corresponding node for: i) each node in the first directed graph lacking a corresponding node in the second directed graph, ii) each node in the second directed graph lacking a corresponding node in the first directed graph, and iii) each node in the first directed graph having a corresponding node in the second directed graph;
create, by the database system, in the combined directed graph, a corresponding directed arc for: i) each directed arc in the first directed graph lacking a corresponding directed arc in the second directed graph, ii) each directed arc in the second directed graph lacking a corresponding directed arc in the first directed graph, and iii) each directed arc in the first directed graph having a corresponding directed arc in the second directed graph; and
output, by the database system, a recommendation for a user to interact with a recommended object based on an object interaction and a conditional probability in the combined directed graph, the conditional probability corresponding to the recommended object and the object interaction.

2. The system of claim 1, wherein the first directed graph comprises proprietary data for a first tenant in a multi-tenant database and the second directed graph comprises proprietary data for a second tenant in the multi-tenant database.

3. The system of claim 1, wherein each node in the directed graph is associated with a corresponding node count identifying a number of user interaction sets that include a corresponding object.

4. The system of claim 1, wherein each node in the combined directed graph which corresponds to a node in the first directed graph which lacks a corresponding node in the second directed graph, is associated with a corresponding node count identifying a number of user interaction sets which include a corresponding object in the first directed graph.

5. The system of claim 1, wherein each node in the combined directed graph that corresponds to a node in the second directed graph which lacks a corresponding node in the first directed graph, is associated with a corresponding node count identifying a number of user interaction sets which include a corresponding object in the second directed graph.

6. The system of claim 1, wherein each node in the combined directed graph which corresponds to a node in the first directed graph which has a corresponding node in the second directed graph, is associated with a corresponding total node count identifying a number of user interaction sets which include a corresponding object in the first directed graph aggregated with a number of user interaction sets which include a corresponding object in the second directed graph.

7. The system of claim 1, wherein a node count and a conditional probability are weighted by at least one of a directed graph weight and a decreasing weight for objects in a user interaction set.

8. A computer program product comprising computer-readable program code to be executed by one or more processors when retrieved from a non-transitory computer-readable medium, the program code including instructions to:
   identify, by a database system, a first directed graph having nodes connected by directed arcs and a second directed graph having nodes connected by directed arcs a directed arc from a first node in a directed graph to a second node in the directed graph represents a conditional probability that previous users who interacted with a first object corresponding to the first node in the directed graph also interacted with a second object corresponding to the second node in the directed graph;
   create, by the database system, a combined directed graph having a corresponding node for: i) each node in the first directed graph lacking a corresponding node in the second directed graph, ii) each node in the second directed graph lacking a corresponding node in the first directed graph, and iii) each node in the first directed graph having a corresponding node in the second directed graph;
   create, by the database system, in the combined directed graph, a corresponding directed arc for: i) each directed arc in the first directed graph lacking a corresponding directed arc in the second directed graph, ii) each directed arc in the second directed graph lacking a corresponding directed arc in the first directed graph, and iii) each directed arc in the first directed graph having a corresponding directed arc in the second directed graph; and
   output, by the database system, a recommendation for a user to interact with a recommended object based on an object interaction and a conditional probability in the combined directed graph, the conditional probability corresponding to the recommended object and the object interaction.

9. The computer program product of claim 8, wherein the first directed graph comprises proprietary data for a first tenant in a multi-tenant database and the second directed graph comprises proprietary data for a second tenant in the multi-tenant database.

10. The computer program product of claim 8, wherein each node in the directed graph is associated with a corresponding node count identifying a number of user interaction sets that include a corresponding object.

11. The computer program product of claim 8, wherein each directed arc in the combined directed graph which corresponds to a directed arc in the first directed graph which lacks a corresponding directed arc in the second directed graph, represents a conditional probability that previous users who interacted with an object corresponding to a beginning node in the first directed graph where the directed arc begins also interacted with an object corresponding to an ending node in the first directed graph where the directed arc ends.

12. The computer program product of claim 8, wherein each directed arc in the combined directed graph which corresponds to a directed arc in the second directed graph which lacks a corresponding directed arc in the first directed graph, represents a conditional probability that previous users who interacted with an object corresponding to a beginning node in the second directed graph where the directed arc begins also interacted with an object corresponding to an ending node in the second directed graph where the directed arc ends.

13. The computer program product of claim 8, wherein each directed arc in the combined directed graph which corresponds to a directed arc in the first directed graph which has a corresponding directed arc in the second directed graph, represents a combined conditional probability that previous users who interacted with an object corresponding to a beginning node in the combined directed graph where the corresponding directed arc begins also interacted with an object corresponding to an ending node in the combined directed graph where the corresponding directed arc ends.

14. A method for combining directed graphs, the method comprising:
   identifying, by a database system, a first directed graph having nodes connected by directed arcs and a second directed graph having nodes connected by directed arcs, a directed arc from a first node in a directed graph to a second node in the directed graph represents a conditional probability that previous users who interacted with a first object corresponding to the first node in the directed graph also interacted with a second object corresponding to the second node in the directed graph;
   creating, by the database system, a combined directed graph having a corresponding node for: i) each node in the first directed graph lacking a corresponding node in the second directed graph, ii) each node in the second directed graph lacking a corresponding node in the first directed graph, and iii) each node in the first directed graph having a corresponding node in the second directed graph;
   creating, by the database system, in the combined directed graph, a corresponding directed arc for: i) each directed arc in the first directed graph lacking a corresponding directed arc in the second directed graph, ii) each directed arc in the second directed graph lacking a corresponding directed arc in the first directed graph, and iii) each directed arc in the first directed graph having a corresponding directed arc in the second directed graph; and
   outputting, by the database system, a recommendation for a user to interact with a recommended object based on an object interaction and a conditional probability in the combined directed graph, the conditional probability corresponding to the recommended object and the object interaction.

15. The method of claim 14, wherein the first directed graph comprises proprietary data for a first tenant in a multi-tenant database and the second directed graph comprises proprietary data for a second tenant in the multi-tenant database.

16. The method of claim 14, wherein each node in the directed graph is associated with a corresponding node count identifying a number of user interaction sets that include a corresponding object.

17. The method of claim 14, wherein each directed arc in the combined directed graph which corresponds to a directed arc in the first directed graph which has a corresponding directed arc in the second directed graph, represents a combined conditional probability that previous users who interacted with an object corresponding to a beginning node in the combined directed graph where the corresponding directed arc begins also interacted with an object corresponding to an ending node in the combined directed graph where the corresponding directed arc ends, wherein the combined conditional probability which represents the corresponding directed arc comprises an adjusted conditional probability divided by a combined node count, wherein the adjusted conditional probability comprises a first adjusted conditional probability aggregated with a second adjusted conditional probability.

18. The method of claim 17, wherein the first adjusted conditional probability comprises a conditional probability that previous users who interacted with an object corresponding to a beginning node in the first directed graph where a corresponding directed arc begins also interacted with an object corresponding to an ending node in the first directed graph where the corresponding directed arc ends multiplied by a corresponding node count identifying a number of user interaction sets which include the object corresponding to the beginning node in the first directed graph where the corresponding directed arc begins.

19. The method of claim 17, wherein the second adjusted conditional probability comprises a conditional probability that previous users who interacted with an object corresponding to a beginning node in the second directed graph where a corresponding directed arc begins also interacted with an object corresponding to an ending node in the second directed graph where the corresponding directed arc ends multiplied by a corresponding node count identifying a number of user interaction sets which include the object corresponding to the beginning node in the second directed graph where the corresponding directed arc begins.

20. The method of claim 17, wherein the combined node count comprises a number of user interaction sets which include the object corresponding to the beginning node in the first directed graph aggregated with a number of user interaction sets which include the object corresponding to the beginning node in the second directed graph.

\* \* \* \* \*